United States Patent
Burley

(10) Patent No.: US 6,525,117 B1
(45) Date of Patent: Feb. 25, 2003

(54) STABILIZED ZINC PYRITHIONE FOR VINYL CHLORIDE POLYMERS

(75) Inventor: Joseph W. Burley, Robbinsville, NJ (US)

(73) Assignee: Akzo Nobel N.V., Arnhem (*) Notice: Subject to any disclaimer, the term of this patent is extended or adjusted under 35 U.S.C. 154(b) by 0 days.

(21) Appl. No.: 09/876,754

(22) Filed: Jun. 7, 2001

Related U.S. Application Data

(60) Provisional application No. 60/210,190, filed on Jun. 8, 2000.

(51) Int. Cl.$^7$ .............................. C08K 5/34; C08K 3/26
(52) U.S. Cl. ......................... 524/99; 524/102; 524/425; 523/122
(58) Field of Search ........................... 524/99, 102, 425; 523/122

(56) References Cited

U.S. PATENT DOCUMENTS

| | | | |
|---|---|---|---|
| 4,474,760 A | 10/1984 | Hill | 424/174 |
| 4,686,239 A | 8/1987 | Rei | 521/55 |
| 5,137,569 A | 8/1992 | Waldron et al. | 106/18.33 |
| 5,319,000 A | 6/1994 | O'Connor et al. | 523/122 |
| 5,344,636 A | 9/1994 | Miyata | 423/593 |
| 5,648,413 A | 7/1997 | Sato et al. | 524/313 |
| 5,741,526 A | 4/1998 | Miyata | 424/635 |
| 5,929,132 A | 7/1999 | Hani et al. | 523/122 |

FOREIGN PATENT DOCUMENTS

| | | | |
|---|---|---|---|
| JP | 10-158452 | 6/1998 | C08L/27/06 |
| JP | 10-182315 | 7/1998 | A01N/43/40 |

OTHER PUBLICATIONS

Derwent Patent Abstract 90–166626/22 (1990).
Derwent Patent Abstract 96–247036/25 (1996).
Derwent Patent Abstract 98–433658/37 (1998).
Derwent Patent Abstract 98–393600/34 (1998).

*Primary Examiner*—Krieellion A. Sanders
(74) *Attorney, Agent, or Firm*—Richard P. Fennelly

(57) ABSTRACT

A vinyl chloride polymer composition comprising a zinc pyrithione and an effective amount for stabilization of the biocide of a mixed metal (e.g., magnesium/aluminum or magnesium/aluminum/zinc) hydroxycarbonate (or "hydrotalcite"). A pre-blend of the biocide and hydroxycarbonate stabilizer is also described.

11 Claims, No Drawings

STABILIZED ZINC PYRITHIONE FOR VINYL CHLORIDE POLYMERS

This application claims the benefit of U.S. Ser. No. 60/210,190, filed Jun. 8, 2000.

BACKGROUND OF THE INVENTION

A variety of microbiocides, including zinc pyrithione, are useful in vinyl chloride polymer compositions (or "PVC"). However, the use of biocides such as zinc pyrithione is largely limited to PVC plastisol formulations where the heat history is not excessive and there is little or no shear that would be likely to have an adverse effect on both the static and dynamic heat stability of the system. Attempts to overcome this negative effect on PVC heat stability by adding epoxidized soybean oil, organophosphite, barium or calcium intermediates (metal soaps) have all met with limited success.

U.S. Pat. Nos. 5,344,636 and 5,741,526 describe certain mixed metal hydroxide/oxide compositions are used in combination with an anti-microorganism agent. Mixed metal hydroxycarbonates (or hydrotalcites) are not disclosed by either patent.

Japanese Patent Publication No. 10-158452 describes PVC compositions containing a mixture of a hydrotalcite compound, a hindered amine compound, and an N-containing sulfur fungicide, such as 2-(4-thiazolyl) benzimidazole.

Japanese Patent Publication No. 10-182315 describes an antimicrobial agent comprising a magnesium/aluminum/zinc hydrocarbonate (hydrotalcite) and either 2-mercapto pyridine-N-oxide (or a derivative of it) dispersed thereon. The antimicrobial efficiency of this system at high temperatures is attributed to its increased solubility (presumably in the resin) and melting point elevation as a consequence of dispersion of the microparticle hydrotalcite. The preparation of the intended antimicrobial agent appears to be tedious since the coating of active ingredient on the surface of the hydrotalcite is achieved in an aqueous medium with a water-soluble salt of the 2-mercapto pyridine-N-oxide. Subsequently, filtration, drying and pulverization are also required before the product can be used. This Japanese patent publication also seems to suggest that zinc pyrithione (zinc bis (2-mercaptopyridine-N-oxide)) is bound to the surface of the hydrotalcite.

SUMMARY OF THE INVENTION

In the present case, a mixed metal (e.g., magnesium/aluminum) hydroxycarbonate (or "hydrotalcite") composition is effective in improving the heat stability of biocides (such as zinc pyrithione) that are contained in such PVC formulations. Performance improvement is obtained by simply adding the hydrotalcite to the biocide-containing formulation with no prior treatment or contact between the two ingredients of the invention. In the present invention there is deemed to be no substantial chemical bonding between the hydrotalcite component and the zinc atom, which continues to be bound to the pyrthione ligand, as is the case for the composition described in Japanese Patent Publication No. 10-182315.

DESCRIPTION OF THE PREFERRED EMBODIMENTS

The present invention relates to the stabilization of the known PVC biocide, zinc pyrithione, which, as earlier described, has certain deficiencies in regard to its detrimental effect on the heat stability of PVC.

The mixed metal hydroxycarbonate stabilizer additive used in connection with the present invention are more commonly referred to as "hydrotalcites". Persons of ordinary skill in the art recognize this type of material, in one embodiment, as being a hydroxycarbonate of magnesium and aluminum, having a typical formula of $Mg_4Al_2OH_{12}CO_3 \times H_2O$. A commercially available material of this type is sold under the trademark HYSAFE 539 by J. M. Huber. The zinc/magnesium/aluminum hydrocarbonates are another embodiment of this type of material that may also be employed. A commercially available material of this type is sold under the trademark ALKAMIZER 4 by Kyowa K K.

As earlier mentioned, it is not necessary to pretreat these materials in aqueous media; in accordance with the present invention, they can simply be dry blended together so that the mixed metal hydroxycarbonate stabilizer will be present in effective amount for its eventual use in the PVC composition. According to this invention, the amount of zinc pyrithione biocide (expressed in terms of active ingredient) that is incorporated into PVC can range from about 100 ppm to about 5000 ppm. The amount of hydroxycarbonate used in conjunction with the zinc pyrithione biocide can range from about 0.2 phr to about 10 phr. More preferred ranges are about 200 to about 3000 ppm for the zinc pyrithione biocide and about 0.5 to about 7 phr for the hydroxycarbonate stabilizer. The most preferred ranges are about 500 to about 2000 ppm for the zinc pyrithione biocide and about 1.0 to about 5 phr for the hydroxycarbonate stabilizer. In general, the amount of hydroxycarbonate added to the PVC will increase with the quantity of zinc biocide added. In accordance with the present invention, the use of relatively low zinc pyrithione biocide levels with relatively high hydroxycarbonate level is also possible. Alternatively, relatively high zinc pyrithione biocide levels in conjunction with relatively low levels of hydroxycarbonate, while not most preferred, can also be employed. Actual levels employed during PVC processing may deviate from the most preferred range to accommodate other additives incorporated by the processor or dictated by the end application.

If the relative amounts of zinc pyrithione and mixed metal hydroxycarbonate to each other in a blend containing these two components is considered, it can range from about 20% to about 99.8%, by weight of the blend of such of zinc pyrithione and mixed metal hydroxycarbonate. Another embodiment of this invention has these two in the following amount: from about 75% to about 98%, by weight of the blend of such of zinc pyrithione and mixed metal hydroxycarbonate.

As earlier mentioned, in a preferred embodiment of the present invention, the presence of a hindered amine stabilizer is not needed in either the zinc pyrithione/stabilizer blend or in the final PVC composition containing that biocide/stabilizer blend.

The PVC formulation can contain the conventional functional additives that have traditionally been used in their normal amounts including: plasticizers; additional stabilizers (ultraviolet and/or heat); dyes; pigments; lubricants; additional biocides; and the like. U.S. Pat. No. 5,575,951 is incorporated herein by reference for showing (for example, at Col. 3, lines 9–40) some such additives that might be used.

The present invention is further described by the Examples that follow.

EXAMPLES

PVC Stability Tests

Oven Heat Stability

This test comprises the fabrication of PVC formulations into test specimens that are subsequently subjected to a simple thermal stability test. Formulations 1, 2 and 3 were subjected to this test. Samples were homogenized on a two-roll mill set at 340° F. for a period of three minutes, cut from the mill and cooled to ambient temperature. Test chips were punched from these specimens and mounted on glass slides. These slides were placed in a simple air-blown oven (set at 370° F.) and subsequently removed at ten-minute intervals until all test samples had degraded to the black point. The times required to attain the black point for each sample are recorded in Table I.

These results clearly show the negative effect zinc pyrithione has on the thermal stability of the PVC formulation and the beneficial effect the magnesium/aluminum hydroxycarbonate has in offsetting this negative effect.

Brabender Torque Rheometer Test

In this test, PVC formulations are masticated by revolving rotors in an enclosed "head" until the degradation point (dramatic torque increase) is reached. Formulations 1–5 were subjected to this test which was performed at 210° C. with a rotor speed of 110 rmp. The charge to the torque rheometer was 60.0 g. A No. 6 head was employed. Samples were removed at three-minute intervals for the duration of the test. The degradation times clearly indicate the catastrophic effect of the zinc pyrithione on dynamic stability and the excellent effect exhibited by the magnesium/aluminum hydroxycarbonate.

Dynamic Mill Stability

This is an alternative dynamic test that is performed on a two-roll mill. PVC formulations that are initially homogenized on the two-roll mill are subjected to an extended period of milling. Relative stability is assessed by the time taken to either degrade or stick to the mill. This is a high shear test. The mill temperature was set at 370° F. Samples were removed from the mill at five-minute intervals until the end of the test. Mill stick times are presented in Table I and again clearly show both the negative effect imparted by zinc pyrithione and the beneficial effect of the magnesium/aluminum hydroxycarbonate.

TABLE I

| | FORMULATION | | | | | |
|---|---|---|---|---|---|---|
| | 1 | 2 | 3 | 4 | 5 | 6 |
| PVC Resin (OXY 225) | 100 | 100 | 100 | 100 | 100 | 100 |
| Phthalate Plasticizer (SANTICIZER 711) | 45.0 | 45.0 | 45.0 | 45.0 | 45.0 | 45.0 |
| Epoxidized Soybean Oil | 3.0 | 3.0 | 3.0 | 3.0 | 3.0 | 3.0 |
| Stearic Acid | 0.4 | 0.4 | 0.4 | 0.4 | 0.4 | 0.4 |
| Calcium Carbonate | 15.0 | 15.0 | 15.0 | 15.0 | 15.0 | 15.0 |
| Titanium Dioxide | 5.0 | 5.0 | 5.0 | 5.0 | 5.0 | 5.0 |
| General Purpose Ba/Zn Stabilizer* | 2.0 | 2.0 | 2.0 | 2.0 | 2.0 | 2.0 |
| Zinc Pyrithione** | | 3.5 | 3.5 | 2.6 | 3.5 | |
| Magnesium/Aluminum Hydroxycarbonate | | | 1.0 | 1.0 | 1.5 | |
| MICROCHEK II D~ | | | | | | 4.4 |
| Over Heat Stability[a] | 105 | 50 | 90 | | | |
| BRABENDER Degradation Time[b] | 20 | <6 | 21 | 24 | 27 | |
| Dynamic Mill Stability[c] (Stick Time) | >45 | 20 | | 40 | 38 | |

*Ba/Zn Stabilizer: Ba = 4.3%, Zn = 1.9%, P = 4.8%.
**5% active paste in PVC/diisodecylphthalate.
~4% active solution of 2-n-octyl 4-isothiazolin-3-one in diisodecylphthalate.
[a], [b], [c] - minutes Antifungal Activity Formulations 1,2,4,5 and 6 were subjected to the ASTM G 21 antifungal test. Test specimens, prepared by two-roll milling, were then subjected to a thermal stability test at 380° F. Samples were removed from the oven at 10-minute intervals. The antifungal activity was assessed as a function of heat treatment and the results are presented in Table II. An established commercial fungicide (Microchek IID) was included for comparison

TABLE II

| | GROWTH RATING Thermal Treatment at 380° F. (min) | | | | |
|---|---|---|---|---|---|
| Sample #: | 0 | 10 | 20 | 30 | 40 |
| 1 | 4 | 4 | 4 | 4 | 4 |
| 2 | 2 | 1 | 4 | 4 | 4 |
| 4 | 2 | 2 | 2/3 | 3/4 | 4 |
| 5 | 0 | 1 | 1 | 3 | 4 |
| 6 | 0 | 2/3 | 3 | 4 | 4 |

Growth ratings
0 - no growth
1 - trace growth (0–10%)
2 - slight growth (10–30%)
3 - moderate growth (30–60%)
4 - heavy/complete growth (60–100%)

As expected, Sample 1 (containing no microbiocide) exhibited no antifungal activity. Zinc pyrithione imparted antifungal properties but resistance to heating was minimal and inferior to Sample 6, which was protected by a commercially available microbiocide. Addition of the magnesium/aluminum hydroxycarbonate to the zinc pyrithione containing system, to create formulations 4 and 5, dramatically improved antifungal activity retention upon thermal treatment. This occurred to the extent where these systems became superior to the commercially available microbiocide. Decreased sensitivity of the zinc pyrithione to thermal treatment is attributed to the decreased degradation of the PVC. This is achieved by the capacity of the magnesium/aluminum hydroxycarbonate to neutralize hydrogen chloride liberated from the PVC during degradation.

Antifungal Activity After UV Exposure

Samples included in this table are identified in previously supplied Table I. Samples were compounded as described in the previously described PVC Stability Test-Oven Heat Stability test. Samples were mounted in a Q-Panel WEATH-EROMETER tester equipped with UV A 340 bulbs. Samples were exposed for the times indicated in Table III, below, and then removed from the tester. These samples were then subjected to the ASTM G 21 antifungal test. The results obtained are presented below. Growth ratings are as described in the footnotes to Table II, above. The following results were obtained:

TABLE III

| Sample Identification | Growth Rating / Expose Time | | | | |
|---|---|---|---|---|---|
| | 0 h | 50 h | 100 h | 150 h | 200 h |
| 1 | 4 | 4 | 4 | 4 | 4 |
| 2 | 1 | 1 | 1 | 4 | 4 |
| 5 | 1 | 1 | 1 | 1 | 3/4 |

Fungal Activity of Hydrotalcites

The fungal activity of hydrotalcites was assessed in comparison to the commercially available biocides, ABF-2 DIDP and zinc pyrithione (ZnP).

Test specimens were prepared according to the technique described in previously described PVC Stability Tests-Oven Heat Stability test. The formulations employed are shown below in Table IV along with their corresponding fungal activities as determined by the ASTM G 21 test. Fungal ratings are as explained in the footnotes to Table III, above.

TABLE IV

| | Formulation | | | | |
|---|---|---|---|---|---|
| | 1 | 2 | 3 | 4 | 5 |
| PVC Resin (Oxy 225) | 100 | 100 | 100 | 100 | 100 |
| Phthalate Plasticizer (Santiciser 711) | 45 | 45 | 45 | 45 | 45 |
| Epoxidized Soyabean Oil | 3 | 3 | 3 | 3 | 3 |
| Stearic Acid | 0.4 | 0.4 | 0.4 | 0.4 | 0.4 |
| Calcium Carbonate | 15 | 15 | 15 | 15 | 15 |
| Titanium Dioxide | 5 | 5 | 5 | 5 | 5 |
| Barium Zinc Stabilizer | 2.0 | 2.0 | 2.0 | 2.0 | 2.0 |
| ABF-@ DIDP (2% active OBPA) | | 2.0 | | | |
| Zinc Pyrithione (5% active paste) | | | 2.0 | | |
| HYSAFE 539 - Mg/Al Hydroxycarbonate | | | | 2.0 | |
| ALKAMIZER 4 - Mg/Al/Zn Hydroxycarbonate | | | | | 2.0 |
| Fungal Activity Rating | 4 | 0 | 1 | 4 | 4 |

Bactericidal Activity after Processing

The following three Tables (Tables V–VII) show additional data that was generated from tests performed with the basic test formulation described in Sample 1 of Table I.

Table V relates to an Oven Stability Test performed at 195° C. with samples being removed at five minute intervals:

TABLE V

| Sample No. | Initial Onset of Microbial Growth (in minutes from start) |
|---|---|
| 1 | 0 |
| 2 | 30 |
| 3 | 35* |
| 4 | 45** |

*the sample removed at 40 minutes showed no growth.
**the sample removed at 50 minutes showed no growth.

Sample 1 contained no biocide as thus was the control.

Sample 2 contained 2.5% of a commercially available paste of zinc pyrithione (5% active) in a linear 7, 11 phthalate plasticizer and is presented for comparison purposes.

Sample 3 is in accordance with the present invention and contained 2.5% of a commercially available paste of zinc pyrithione in combination with 1 phr (part per hundred of resin) of a commercially available magnesium/aluminum hydrotalcite (Hysafe 539 brand).

Sample 4 is also in accordance with the present invention and contained 2.5% of a commercially available paste of zinc pyrithione in combination with 2 phr of a commercially available magnesium/aluminum hydrotalcite (Hysafe 539 brand).

Samples 3 and 4 showed significantly better performance than the control and were also generally superior to the comparison run under the test conditions employed.

Table VI illustrates Brabender Stability tests performed at 195° C. with the charge to the Brabender head being 66 grams of compound and with the test specimens being removed at five minute intervals.

TABLE VI

| Sample No. | Time Interval - Growth Rating (in minutes from start) |
|---|---|
| 1 | —* |
| 2 | 27 |
| 3 | 30+** |

*the sample showed no growth at nine minutes after which monitoring was suspended due to degradation of the PVC.
**the sample showed no growth at thirty minutes at which time the testing was suspended.

Sample 1 contained 2.0% of a commercially available paste (5% active) of zinc pyrithione in diisodecylphthalate.

Sample 2 contained 2.0% of a paste (5% active) of zinc pyrithione in diisodecylphthalate and also contained 1.5 phr of a commercially available magnesium/aluminum hydrotalcite (Hysafe 539 brand).

Sample 3 contained 2.0% of a paste (5% active) of zinc pyrithione in diisodecylphthalate and also contained 2.5 phr of a commercially available magnesium/aluminum hydrotalcite (Hysafe 539 brand).

Samples 2 and 3, which are in accordance with the invention, showed good performance under the test conditions employed.

Table VII illustrates the retention of bacterial properties upon two-roll milling at 195° C. (G=growth; NG=no growth):

TABLE VII

| Sample No. | Time Interval - Growth Rating | |
|---|---|---|
| | 5 min. | 10 min. |
| 1 | G | NG |
| 2 | NG | G |
| 3 | NG | NG |
| 4 | G | G |

Sample 1 was a control containing no biocide.

Sample 2 contained 2.0% of a paste (5% active) of zinc pyrithione in diisodecylphthalate and is presented for comparison purposes.

Sample 3, which is in accordance with the present invention, contained 2.0% of a paste (5% active) of zinc pyrithione in diisodecylphthalate and also contained 2.5 phr of a commercially available magnesium/aluminum hydrotalcite (Hysafe 539 brand).

Sample 4, which is presented for comparison purposes, contained 2.5% of a commercially available 4% solution of 2-n-octyl-4-isothiozolin-3-one in diisodecylphthalate (Microchek II brand).

It is to be understood that the reactants and components referred to by chemical name or formula anywhere in the specification or claims hereof, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a mixture to be used in conducting a desired reaction. Even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. Thus, the fact that a substance, component or ingredient may have lost its original identity through a chemical reaction or transformation during the course of contacting, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

I claim:

1. A dry blended mixture of zinc pyrithione and an effective amount, for stabilization of the zinc pyrithione, of a mixed metal hydroxycarbonate.

2. A composition as claimed in claim 1 wherein the mixed metal hydroxycarbonate is a magnesium/aluminum hydroxycarbonate.

3. A composition as claimed in claim 1 wherein the amount of hydroxycarbonate in the composition is present at from about 20% to about 99.8%, of the blend of zinc pyrithione and mixed metal hydroxycarbonate.

4. A composition as claimed in claim 1 wherein the amount of hydroxycarbonate in the composition is present at from about 75% to about 98%, of the blend of zinc pyrithione and mixed metal hydroxycarbonate.

5. A composition as claimed in claim 1 wherein the hydroxycarbonate is a magnesium/aluminum hydroxycarbonate and is present at from about 20% to about 99.8%, of the blend of zinc pyrithione and mixed metal hydroxycarbonate.

6. A composition as claimed in claim 1 wherein the hydroxycarbonate is a magnesium/aluminum hydroxycarbonate and is present at from about 75% to about 98%, of the blend of zinc pyrithione and mixed metal hydroxycarbonate.

7. A composition as claimed in claim 1 wherein the hydroxycarbonate is a magnesium/aluminum/zinc hydroxycarbonate and is present at from about 20% to about 99.8%, of the blend of zinc pyrithione and mixed metal hydroxycarbonate.

8. A composition as claimed in claim 1 wherein the hydroxycarbonate is a magnesium/aluminum/zinc hydroxycarbonate and is present at from about 75% to about 98%, of the blend of zinc pyrithione and mixed metal hydroxycarbonate.

9. A stablized PVC composition containing an effective amount for stabilization of the composition of any one of claims 1–8.

10. A stabilized PVC composition as claimed in claim 9 wherein the effective amount of zinc pyrithione therein is from about 100 ppm to about 5000 ppm.

11. A stabilized PVC composition as claimed in claim 9 wherein the effective amount of mixed metal hydroxycarbonate therein is from about 0.2 phr to about 10 phr.

* * * * *